United States Patent
Aoki

(10) Patent No.: US 6,389,911 B1
(45) Date of Patent: May 21, 2002

(54) MAGNETOSTRICTION DETECTION TYPE SENSOR

(75) Inventor: Hideaki Aoki, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/414,433

(22) Filed: Oct. 7, 1999

(30) Foreign Application Priority Data

Oct. 9, 1998 (JP) .............................. 10-288218

(51) Int. Cl.[7] ................ G01L 1/12; G01L 1/25
(52) U.S. Cl. .................................. 73/862.69
(58) Field of Search ........... 73/862.69, 862.333, 73/862.36, 862.335, 313; 324/207.13

(56) References Cited

U.S. PATENT DOCUMENTS

| | | | |
|---|---|---|---|
| 4,161,665 A | 7/1979 | Buck et al. | |
| 5,396,266 A | 3/1995 | Brimhall | |
| 5,522,269 A | * | 6/1996 | Takeda et al. ......... 73/862.333 |
| 5,952,823 A | * | 9/1999 | Nyce et al. ............ 324/207.13 |

* cited by examiner

*Primary Examiner*—Benjamin R. Fuller
*Assistant Examiner*—Octavia Davis
(74) *Attorney, Agent, or Firm*—Arent Fox Kintner Plotkin & Kahn, PLLC

(57) ABSTRACT

A magnetostriction detection type sensor includes a substrate. This substrate is bonded, through an adhesive or the like, with a magnetostrictive element of a circular columnar form and a cylindrical magnetostriction detecting coil coaxially receiving magnetostrictive element. The substrate is also mounted with a housing case formed by a magnetic member, to accommodate a magnetostrictive element and magnetostriction detecting coil nearly in a shield state. The housing case is formed with a projection that is in surface contact with a tip surface of the magnetostrictive element, and a spherically formed tip for contacting an object to be measured.

5 Claims, 1 Drawing Sheet

MAGNETOSTRICTION DETECTION TYPE SENSOR

BACKGROUND OF THE INVENTION

1. Field of the Invention

This invention relates to magnetostriction detection type force sensors and, more particularly, to a magnetostriction detection type force sensor for detecting an external stress through use of a magnetostrictive element.

2. Description of the Prior Art

The conventional magnetostriction detection type force sensor 1, as shown in FIG. 2, has an accommodation case 2 in a cylindrical form serving also as a mounting substrate. The accommodation case 2 is inserted by a magnetostriction detecting coil 4 wounded around a coil bobbin 3. The coil bobbin 3 accommodates therein a magnetostrictive element 5 of a circular columnar form. Further, a cap member 7 with a spherical end face 6 is provided on an end of the magnetostrictive element 5.

In the conventional magnetostrictive detection type force sensor 1 constructed as above, the load force for example due to an object to be measured 8 is entirely applied onto the magnetostrictive element 5 through the cap member 7. Accordingly, the conventional force sensor 1 has a disadvantage of insufficiency in impact resistance. Meanwhile, there exists a gap between the accommodation case 2 having therein the magnetostrictive element 5 and the cap member 7, making it difficult to provide a sufficient magnetic path. The leak of magnetic flux may cause a problem of poor detection accuracy.

SUMMARY OF THE INVENTION

It is therefore a primary object of the present invention to provide a magnetostriction detection type force sensor which is excellent in impact resistance, small in size and high in accuracy.

A magnetostriction detection type sensor according to the present invention, comprises: a substrate formed by a magnetic member; a magnetostrictive element formed in a columnar form provided on the substrate; a magnetostriction detecting coil formed in a cylindrical form to coaxially receive the magnetostrictive element; and a housing case provided on the substrate in a manner covering the magnetostriction detecting coil and contacted with a tip surface of the magnetostrictive element.

Because the columnar magnetostrictive element and magnetostriction detecting coil inserted by this element provided on the magnetic member substrate are accommodated and protected within the housing case having the spherical end surface, the compression stress applied from an object to be measured is dispersed into the magnetostrictive element and substrate by the spherical end surface. Also, because a magnetic path is secured by the housing case, no leak of magnetic flux occurs.

According to the present invention, it is possible to reduce external forces to be applied to the magnetostrictive element. Thus, the resistance to load or impact is improved. Also, an ideal magnetic path is formed, sensitivity is improved, and surrounding magnetic fields are shielded from effecting upon. Furthermore, the sensor can be reduced in size.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
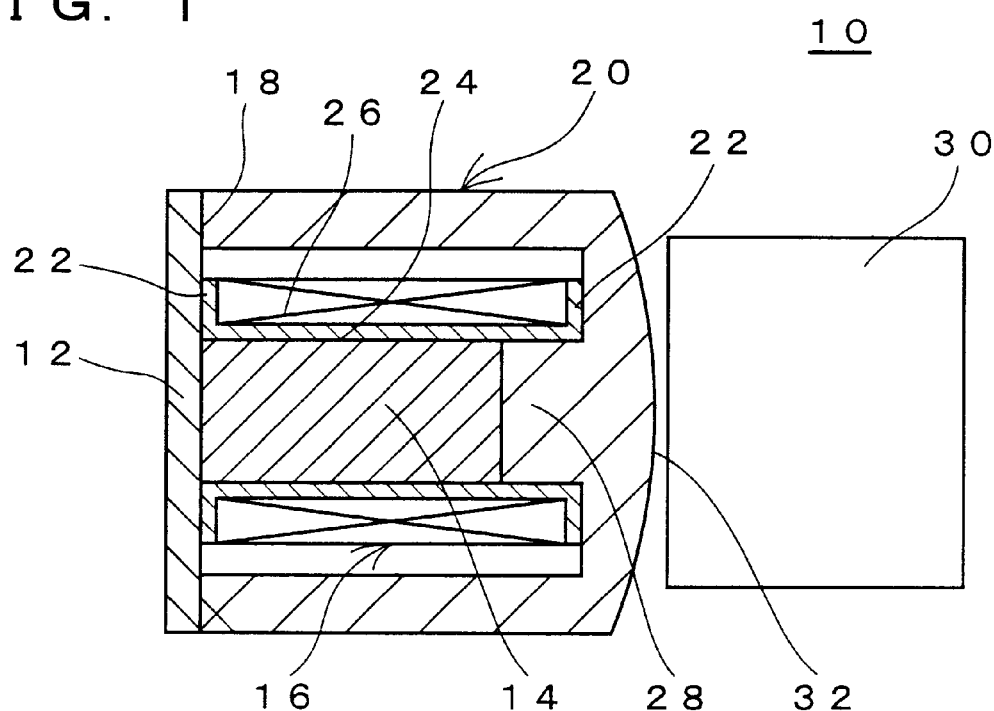
FIG. 1 is an illustrative view showing a magnetostriction detection type force sensor according to one embodiment of the present invention.
Figure 2:
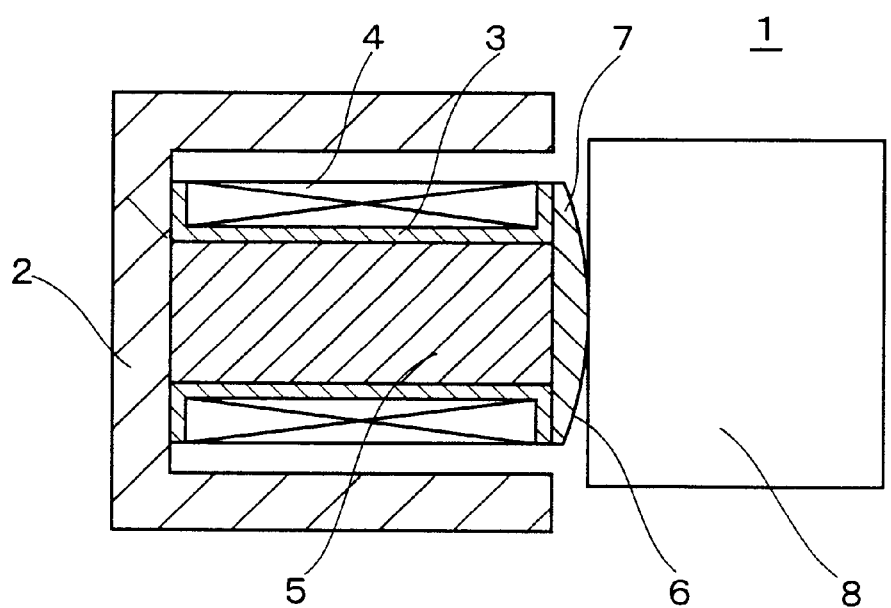
FIG. 2 is an illustrative view showing a conventional sensor corresponding to FIG. 1.

In FIG. 1 is illustrated a magnetostriction detection type force sensor 10 according to one embodiment of the present invention. The magnetostriction detection type force sensor 10 includes a substrate 12 formed in square of a high strength magnetic material, such as a ferrite based magnetic material. A magnetostrictive element 14 in a circular column form is bonded, through an adhesive or the like, onto a center portion of the substrate 12 and has a magnetic permeability to be varied depending upon a stress acted thereupon. A magnetostriction detecting coil 16 is formed in a cylindrical form to coaxially receive the magnetostrictive element 14, and fixed on the substrate 12. A housing case 20 has an opening end 18 fixed onto the substrate 12, to accommodate and protect therein the magnetostrictive element 14 and magnetostriction detecting coil 16.

The magnetostrictive element 14 is formed of a magnetostrictive material containing a rare earth metal element and iron, i.e. a material to cause deformation when applied by a magnetic field, or a material possessing a converse magnetostriction effect (Villari effect) to cause a magnetic field when undergone by a deformation. Such materials includes, for example, an Ni—Fe based magnetostrictive material or RFe based magnetostrictive material. Particularly, it is preferred to use an RFe based magnetostrictive material, called a super magnetostrictive material, which is extremely great in amount of magnetostriction. In this case, a resulting sensor obtainable is extremely large in magnetic resistance change, high in output voltage and stable in temperature characteristics.

Meanwhile, the magnetostriction detecting coil 16 is formed by an enamel coated copper coil 26 with a proper diameter. The coil 26 is wound around a coil bobbin 24 of a cylindrical form with flanges 22 and 22 at respective ends. The magnetostriction detecting coil 16, including the coil bobbin 24, has a length greater than a length of the magnetostrictive element 14.

Furthermore, the housing case 20 is formed of a magnetic material into a bottomed cylindrical form. The housing case 20 is also formed, at a center of a inner bottom surface, with a columnar projection 28 having nearly a same diameter as the magnetostrictive element 14, to be placed in contact with an end surface of the magnetostrictive element 14. A spherical end surface 32 is formed on an outer surface of the housing case, to be abutted against an object to be measured 30. The magnetostrictive element 14 and the magnetostriction detecting coil 16, coaxially receiving the magnetostrictive element 14, are accommodated nearly in a shield state by the substrate 12 and housing case 20. Also, the cylindrical projection 28 provided in the inner surface of the housing case 20 is inserted to an inner side of the magnetostriction detecting coil 16 and placed in contact with and in abutment against the end face of the magnetostrictive element 14.

In the above structure, where a compression stress is applied from the object to be measured 30 to the housing case 20, the compression stress is allowed to disperse into the projection 28 and opening end face 18 due to the spherical end face 32 of the housing case 20. Thus, the magnetostrictive element 14 is relieved of stresses directly acted thereon. Assuming the magnitude of a compression stress be F and the respective flat surface areas of the projection 28 and the opening end face 18 of the housing case 20 be S1 and S2, the projection 28 is acted upon by a compression stress F1=F×S1/(S1+S2) while the opening end face 18 is by a compression stress F2=F×S2/(S1+S2). If a deformation is caused in the magnetostrictive element 14 due to the compression stress F1 acting on the projection 28, the magnetostrictive element 14 is changed in magnetic permeability. This results in a change in magnetic flux density of the magnetostrictive element 14, a change in the magnetic flux linked to the magnetostriction detecting coil 16, and a change in the inductance of the magnetostriction detecting coil 16. From the inductance change, it is possible to detect a magnitude of an external stress or torque applied to the magnetostrictive element 14.

Accordingly, by detecting an inductance change of the magnetostriction detecting coil 16, measurement can be made on a magnitude of a compression stress F (F−F1+F2) applied from the object to be measured 30 to the spherical end face 32 of the housing case 20. Also, the substrate 12 and magnetic-member housing case 20, together with the magnetostrictive element 14, form a complete magnetic path thereby preventing against leak of magnetic flux and hence eliminating measurement error. Thus, measurement accuracy is further improved.

Incidentally, the magnetostriction detecting sensor 10 of the invention has applications including, for example, the use of a pedal-operated torque sensor for an auxiliary-powered bicycle (assist-electric bicycle) mounted with an electric motor and a power source battery therefor. In such a case, the sensor is arranged in a bicycle pedal section so as to detect pedal force torque, wherein auxiliary power is applied as required by the electric motor in order to facilitate running on a sloping road or the like. Also, another application includes the use of a weight sensor to detect a weight of washing for a full-automatic washer using a microcomputer. In this case, water quantity, washing time, etc. can be automatically set depending upon a detected weight of washing by the sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetostriction detection type sensor, comprising:

a substrate formed by a magnetic member;

a magnetostrictive element formed in columnar form having an end of contact with said substrate;

a magnetostrictive detecting coil formed in a cylindrical form to coaxially receive said magnetostrictive element; and a housing case which is formed of a magnetic member into a bottomed cylindrical form and is fixed to said substrate at an open end thereof in a manner covering said magnetostrictive element and said magnetostrictive detecting coil and contacting a tip surface of said magnetostrictive element opposite said end fixed to said substrate at a center of an inner surface of a bottom of said housing case.

2. A magnetostriction detection type sensor according to claim 1, wherein said magnetostriction detecting coil projects relative to said magnetostrictive element.

3. A magnetostriction detection type sensor according to claim 1 or 2, wherein said housing case at an inner surface includes a projection abutting a tip surface of said magnetostrictive element.

4. A magnetostriction detection type sensor according to any of claims 1 to 3, wherein said housing case at an outer surface includes a spherical end surface.

5. A magnetostriction detection type sensor according to any of claims 1 to 4, wherein said housing case is formed by a magnetic member.

\* \* \* \* \*